United States Patent Office 3,459,996
Patented Aug. 5, 1969

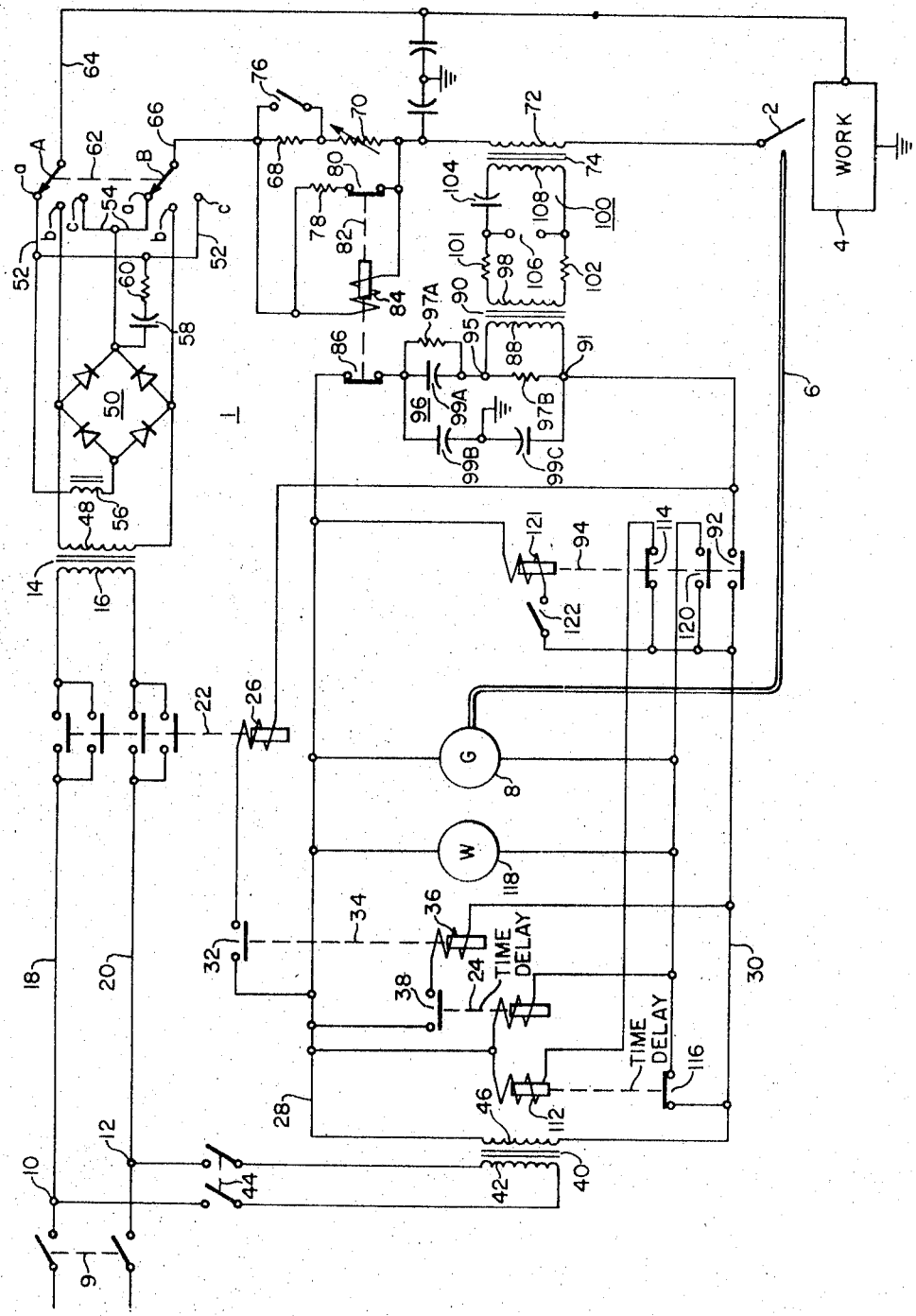

3,459,996
STARTING CIRCUIT FOR DIRECT CURRENT
ARC WELDER
Floyd E. Adamson, Ellicott City, Md., and James E. Frederick, Clarence, N.Y., assignors to Westinghouse Electric Corporation, Pittsburgh, Pa., a corporation of Pennsylvania
Filed Sept. 14, 1967, Ser. No. 667,735
Int. Cl. H05b 41/14
U.S. Cl. 315—205                                6 Claims

ABSTRACT OF THE DISCLOSURE

It is common in direct current welders to use a resistance, through which the welding current flows to a tungsten welding electrode, to control the magnitude of the arc current. It is further old to envelop the weld area in a monotomic gas such as argon or helium thereby to prevent contamination of the weld from the atmosphere. This disclosure provides a shunt circuit around, at least a portion of, the series resistance so as to enhance the initiation of the arc between the tungsten electrode and the work to be welded. Means is also provided to interrupt this shunting circuit as soon as welding current flows so that the series resistors are effective to control the magnitude of the welding arc current.

In the past trouble has been experienced with arc welders of the TIG type, because of the failure of the welder to initiate the welding arc current with the welder set for low arc current. This has been true even though a high frequency starting circuit supplies a low-power high frequency arc between the tungsten electrode and the work. In accordance with this invention, there is provided means for rendering ineffective, at least some of, the current limiting impedance solely until the arc is initiated.

In welding apparatus of the AC-DC type, and especially the type in which there is provided a rectifying network for rectifying a single phase electrical quantity supplied thereto, it is also advantageous to provide an energy storage circuit connected across the output of the rectifier network. In some instances this is applicable to networks supplied from a polyphase source. This storage circuit may comprise a large capacitor connected in series with a resistor. The magnitude of this resistor is so related with the capacity of the capacitor and with the current range of the welding apparatus that the normal charge which is maintained in the capacitor is such that its potential is equal to the average value of the output voltage of the rectifying network, but which charge increased during off times of the arc welding apparatus due to the capacitor being charged through the resistor to a potential which may approach that of the peak value of the alternating voltage supplied thereto. This increased voltage is available for starting the arc and is substantially above the average voltage which exists during operation of the apparatus.

It is an object of this invention to provide an improved means for insuring the starting of the power arc in an arc welding apparatus when the apparatus is operating at a low current.

It is a further object of this invention to provide, in an impedance current controlled arc welding apparatus, means to shunt certain of the current controlling impedances during arc starting to enhance the initiation of the welding arc.

It is an object of this invention to provide means which will increase the arc starting voltage above the operating voltage of the arc welder.

Other objects of the invention will be apparent from the specification, the appended claims and the drawing, in which the single figure thereof indicates diagrammatically a welding apparatus embodying the invention.

Referring to the drawings by characters of reference, the numeral 1 indicates generally an arc welding apparatus. The apparatus 1 energizes a usual electrode 2 to strike an arc between it and a workpiece 4. Preferably the material of the electrode 2 is tungsten and the magnitude of the arc current never substantially exceeds the magnitude which causes melting and disintegration of the tungsten electrode. This type of arc welding is generally referred to in the art as TIG welding and further normally embodies the application of an inert gas surrounding the arc. For purposes of simplicity, the inert gas supply is only shown diagrammatically as indicated by the pipe 6 which extends from a gas controlling valve 8 to an area adjacent the electrode 2 and workpiece 4. Since this type of apparatus so far described is old in the art, a further description is not believed necessary.

The welding apparatus 1 may be energized from a suitable source of single phase alternating electric energy supplied thereto through a suitable disconnect switch 9. The switch 9 is connected to a pair of input terminals 10 and 12 which are connected through a pair of power busses 18 and 20 to the primary winding 16 of a power transformer 14. A suitable power controlling switching means 22 has its circuit controlling contactor connected in the busses 18 and 20 to control the energization of the transformer 14 and thereby the flow of welding power to the electrode 2. The switch means 22 may comprise any suitable switching device such as the illustrated relay or contractor having at least one set of normally open contacts in each of the busses 18 and 20. As illustrated two sets of contacts are provided in each of the busses so as to permit a reduction in size of the relay. The energizing winding 26 of the switching device 22 is connected between a pair of control energy supplying busses 28 and 30 through normally open contacts 32 of a control relay 34. The control winding 36 of relay 34 is connected between the control busses 28 and 30 through the normally open contacts 38 of a prepurge timer 24. Energy for the control busses is supplied from the input terminals 10 and 12 through a control potential transformer 40 having its primary winding 42 connected to the input busses 10 and 12 through a suitable disconnect switch 44. The secondary winding 46 has its end terminals connected to the control busses 28 and 30.

The power transformer 14 has its secondary winding 48 connected to the alternating current input terminals of a fullwave bridge type rectifier 50. The direct current output terminals of the bridge 50 are connected to a pair of power output busses 52 and 54 through a direct current smoothing reactor 56. A rather large capacity capacitor 58 is connected in series with a resistor 60 between the busses 52 and 54. The capacitor 58 may have a value of 200 microfarads while the resistor 60 may have a value of 4 ohms and a radiating value of 100 watts.

The busses 52 and 54 are connectable through a polarity controlling switch 62 to a pair of busses 64 and 66. As illustrated, the polarity switch 62 comprises a two section, three position switch in which the bus 52 is connected to terminals $a$ and $c$ of the switch sections A and B respectively of the switch 62, the bus 54 is connected to the terminals $c$ and $a$ of the sections A and B respectively, and the $b$ terminals of the sections A and B are connected directly to the end terminals of the secondary winding 48. The polarity switch 62 is operable in its illustrated position to apply reverse DC polarity between the electrode 2 and the workpiece 4, in its $c$ position to apply reverse DC polarity therebetween, and in its $b$ position to apply AC therebetween.

As illustrated, the bus 64 directly connects the pole of the switch section A to the workpiece 4, while the bus 66 connects the switch section B to the tungsten electrode 2 through resistive impedances 68 and 70 and the secondary winding 72 of the high frequency introducing transformer 74. The resistive impedances 68 and 70 may be of the variable magnitude type as illustrated by the impedance 70 or may be fixed value impedances shunted by switch means as illustrated by the impedance 68 and switch 76. A resistive impedance 78 (which may be in the order of 4 ohms when the welding current is in the order of 5 amperes) is connected in shunt with the resistive impedances 68 and 70 through the normally closed contacts 80 of a relay 82. The control winding 84 of relay 82 is connected in shunt with the contacts 80 and the impedance 78.

The high frequency energy for energizing the transformer winding 72 may be obtained in any desired manner. As illustrated, it is obtained from the control busses 28 and 30 under control of the normally closed contacts 86 of the relay 82. More specifically, the primary winding 88 of transformer 90 has one terminal 91 connected to the bus 30 through the normally open contacts 92 of a control relay 94 and its other terminal 95 connected to the bus 28 through the normally closed contacts 86. The phase of the potential at the terminals 91 and 95 is shifted ahead of the phase of the voltage between busses 28 and 30 by the phase shifting network 96. The network 96 comprises the resistors 97A and 97B along with the capacitor 99A. The secondary winding 98 of transformer 90 is connected to an oscillating network 100 through a pair of resistors 101 and 102. The network 100 comprises a capacitor 104, an arc gap 106 and a primary winding 108 of the transformer 74.

It is believed that the remainder of the structure may best be explained by a description of operation which is as follows: Upon closure of the main disconnect switch 9 and of the disconnect switch 44, the transformer 40 is energized to supply an alternating potential between the control busses 28 and 30 which potential may, for example, be of a suitable voltage such as 115 volts and of 60 cycle which frequency is that normally supplied by power companies in the United States. This energization of the busses 28 and 30, causes the control winding of the time delay relay 112 to become energized through the normally closed contacts 114 of the control relay 94. The time delay relay 112 as is the time delay relay 24 of the type in which the contacts thereof are actuated from their normal condition to their actuated position at the end of a predetermined delay time after energization of the control winding but which return to their normal condition without appreciable time delay subsequent to deenergization of the energizing winding. The time delay afforded by the relay 112 may be in the order of 0 to 60 seconds depending upon the length of post purge time of the inert gas which is desired.

Since the winding of the time delay relay 24 is connected between the busses 28 and 30 through the contacts 116 of the time delay switch 112 and these may not open before the time delay relay 24 times out to close its contacts 38. The relay 36 may become momentarily energized but this is without effect since the relay 22 cannot become energized due to the open contacts 92. The gas controlling valve 18 and the water control valve 118 which respectively control the flow of coolant and the inert gas respectively may be energized for a period equal to the time delay interest of the relay 112 but this is incidental and of no appreciable concern. As will be described below this interest is for the purpose of insuring a proper post purge and post cooling time.

The winding 121 of the relay 94 is connected between the busses 28 and 30 through a welding control switch 122 which may be a foot switch or a switch located on the welding gun which carries the tungsten electrode 2. As long as the control switch 122 remains open, the contacts 92 and 120 will be open and the contact 114 will be closed. The closed contacts 114 maintain the time delay relay 112 energized and its contacts 116 remain in their open or actuated position (after the initial time out).

When it is desired to make a weld, the weld control switch 122 is closed whereby the relay 94 is energized to open its normally closed contacts 114 and close its normally open contacts 92 and 120. Closure of the contacts 92 energizes the high frequency oscillating network 100 to supply a high frequency arc-starting discharge between the tungsten electrode 2 and the workpiece 4. Closure of the normally open contacts 120 completes an energizing circuit for the gas and water valves 18 and 118 whereby the flow of the gas and water controlled thereby is immediately initiated. This closure of the contacts 120 also energizes the time delay relay 24 which after its time delay interval closes its contacts 38 to energize the control winding 36. This energizes the relay 34 and contacts 32 close to energize the winding 26 of the switch means 22 through the now closed contacts 92. Upon energization relay 22 closes its contacts and the primary winding 16 of the transformer 14 becomes energized to energize the busses 64 and 66, and thereby the welding electrode 2. The opening of the normally closed contacts 114 deenergizes the time delay relay 112 whereby its contacts 116 close without effect since the contacts 120 in shunt therewith are already closed.

Prior to the initiation of welding current between the electrode 2 and workpiece 4 insufficient potential drop exists across the impedances 68 and 70 to energize the winding 84 sufficiently to actuate the contacts 80 and 86 of the relay 82 out of their normally closed positions. As long as the contacts 86 are closed, the high frequency potential is supplied by the transformer 72 between the electrode 2 and workpiece 4. As long as contacts 80 are closed, the bus 66 is connected directly to the electrode 2 through 78 in shunt with the impedances 68 and 70. This shunt connection assures an increased current flow between the electrode 2 and the workpiece 4 during striking of the arc. For a reason not completely understood by applicants this shunt connection greatly enhances the arc starting characteristics. This is true even though at the instant before starting there should be no potential drop across the impedances 68 and 70. It is to be noted that prior to opening of the shunt connection sufficient current must flow to establish the required voltage drop to actuate the relay 82. This interval while extremely short and of a duration which will not cause overheating at the arcing area is apparently sufficient to establish an arc which will be maintained by the impedance of the elements 68 and 70.

Current flow between the busses 64 and 66 through the impedances 68, 70 and 78 establish a voltage drop whereby the relay 82 opens its normally closed contacts 80 and 86. Opening of the contacts 80 inserts the impedances 68 and 70 to control the welding current flow between the electrode 2 and the workpiece 4. The opening of the contacts 86 deenergizes the high frequency starting network, and this will remain deenergized as long as the arc current continues to flow.

When it is desired to terminate the welding operation, the welding control switch 122 is opened whereby the contacts 92 and 120 open and the contacts 114 close. Since there is a time delay between the energization of the winding 112 and the opening of the contacts 116, the gas and water valves 18 and 118 will remain energized for the post purge time period to provide purge and cooling times. At the end of the delay time of the relay 112, its contacts 116 open and the valves 8 and 118 become deenergized and further flow of gas and water terminates.

Since numerous changes may be made in the above-described apparatus and different embodiments of the invention may be made without departing from the spirit thereof, it is intended that all matter contained in the foregoing description or shown in the accompanying drawings, shall be interpreted as illustrative and not in a limiting sense.

What is claimed and is desired to be secured by the U.S. Letters Patent is as follows:

1. In a welding apparatus a pair of input terminals adapted to be connected to a source of unidirectional potential electrial energy, a pair of output terminals adapted to be connected between a welding electrode and a work-piece to be welded as a consequence of an arc between said electrode and said work-piece, impedance means, a current conducting network connecting said pair of input terminals to said pair of output terminals and including said impedance means in series circuit with one of said output terminals, a substantially non-inductive impedance, a current flow controlling means including an actuator, first circuit means connecting said non-inductive impedance in shunt with said impedance means and including said current controlling device, and second circuit means connecting said actuator to said current conducting network, said second circuit means being actuated in response to current flow between said output terminals to actuate said actuator to reduce the current flow through said non-inductive impedance.

2. The combination of claim 1 in which said impedance means is primarily resistive in nature, said non-inductive impedance is a resistor, and said current flow controlling means is a relay having circuit controlling contacts in series with at least a portion of said non-inductive impedance.

3. In a welding apparatus, a plurality of input terminals adapted to be connected to a source of electrical energy, a pair of output terminals adapted to be connected between a welding electrode and a work-piece to be welded when current flows between said electrode and said work-piece, first current flow controlling means, rectifying means, a current conducting network connecting said pair of input terminals to said pair of output terminals and including said current flow controlling means and said rectifying means whereby said output terminals are energized with unidirectional potential under control of said current flow controlling means, a first substantially non-inductive impedance means, a second current flow controlling means including an actuator, first circuit means connecting said non-inductive impedance means into said current network in shunt with said first current flow controlling means, and second circuit means interconnecting said actuator to said current conducting network, said second circuit means being actuable in response to current flow between said output terminals to actuate said actuator to reduce the current flow through said non-inductive impedance means.

4. The combination of claim 3 in which said first current flow controlling means comprises second impedance means connected in series circuit with one of said output terminals.

5. The combination of claim 4 in which said second impedance means is substantially non-inductive, said second current flow controlling means comprises a relay having circuit controlling contacts, said first circuit means connects said contacts in series circuit with said first impedance means, and said actuator is effective to open said contacts in response to a predetermined minimum magnitude of current flow between said output terminals.

6. The combination of claim 5 in which said impedance means are resistors.

No references cited.

JAMES W. LAWRENCE, Primary Examiner

C. R. CAMPBELL, Assistant Examiner

U.S. Cl. X.R.

219—135; 315—289, 310; 323—94